(12) United States Patent
Yang (10) Patent No.: US 6,295,113 B1
(45) Date of Patent: Sep. 25, 2001

(54) TWISTED NEMATIC COLOR LIQUID CRYSTAL DISPLAY

(75) Inventor: Chiu-Lien Yang, Taipei Hsien (TW)

(73) Assignee: Picvue Electronics, Ltd., Hsinchu Hsien (TW)

( * ) Notice: Subject to any disclaimer, the term of this patent is extended or adjusted under 35 U.S.C. 154(b) by 0 days.

(21) Appl. No.: 09/312,947

(22) Filed: May 17, 1999

(30) Foreign Application Priority Data

Dec. 16, 1998 (TW) .................................................. 87120921

(51) Int. Cl.$^7$ .......................... G02F 1/139; G02F 1/1335
(52) U.S. Cl. .......................... 349/179; 349/113; 349/117; 349/180; 349/181
(58) Field of Search .................................. 349/179, 180, 349/181, 132, 117, 113, 96

(56) References Cited

U.S. PATENT DOCUMENTS

| | | | |
|---|---|---|---|
| 5,191,454 | * | 3/1993 | Iijima et al. ............................. 349/99 |
| 5,570,211 | * | 10/1996 | Hanaoka et al. ........................ 349/53 |
| 5,583,678 | * | 12/1996 | Nishino et al. ....................... 349/118 |
| 5,585,950 | * | 12/1996 | Nishino et al. ....................... 349/118 |
| 5,724,112 | * | 3/1998 | Yoshida et al. ....................... 349/117 |
| 5,982,464 | * | 11/1999 | Wang et al. .......................... 349/180 |
| 6,144,430 | * | 11/2000 | Kuo ........................................ 349/96 |

* cited by examiner

Primary Examiner—James A. Dudek
Assistant Examiner—Tai V. Duong
(74) Attorney, Agent, or Firm—Jiawei Huang; J. C. Patents (57) ABSTRACT

A twisted nematic color liquid crystal display. The liquid crystal display comprises parallel glass substrates covered by a transparent electrode and an alignment film, a twisted nematic liquid crystal between the glass substrates, a retardation layer and polarizers. Between the glass substrates, a liquid crystal unit which forms the liquid crystal has a twist angle about 70 to about 180 about degree while free of an externally applying voltage. A product of anisotropy of refractive index for the twisted nematic liquid crystal $\Delta n$ and the thickness d thereof, that is, $\Delta n \cdot d$, is set in a range between about 1100 Å to about 2000 Å. Without using a passive device such as an external color light source or color filter, a multi-color or full color display is formed by an active controlling method of birefringence of electric field via applying a voltage on the transparent electrode.

14 Claims, 10 Drawing Sheets

TWISTED NEMATIC COLOR LIQUID CRYSTAL DISPLAY

CROSS-REFERENCE TO RELATED APPLICATION

This application claims the priority benefit of Taiwan application Ser. No. 87120921, filed Dec. 16, 1998, the full disclosure of which is incorporated herein by reference.

BACKGROUND OF THE INVENTION

1. Field of the Invention

The invention relates in general to a color liquid crystal display (LCD). More particularly, to a twisted nematic (TN) color liquid crystal display.

2. Description of the Related Art

Being affected by an external effect such as an electric field or thermal energy, the molecular arrangement of a liquid crystal is altered to cause variation in optical characteristics such as birefringence, optical rotatory power, dichroism, scattering and optical rotatory dispersion. The visual effect due to the variation of these optical characteristics can thus be utilized in the fabrication of liquid crystal display. The main structure of a liquid crystal display comprises a liquid crystal unit disposed between two glass substrates covered by transparent electrodes.

The nematic liquid crystal comprises bacilliform molecules arranged parallel to a long axis direction of each liquid crystal molecule. In addition, these liquid crystal molecules are mobile as a fluid. Nematic liquid crystal has a characteristic of anisotropy for optics, electricity, and magnetism. Being experienced an external electric field or magnetic field, the arrangement of these liquid crystal molecules is altered. As a consequence, the related characteristics of the liquid crystal are changed. However, while the electric or magnetic field is removed, the liquid crystal restores to an original arrangement before the alteration.

Twisted nematic liquid crystal display is one of those liquid crystal displays controlled by electric field. The main body comprises a liquid crystal unit and two polarizers. The liquid crystal unit further comprises two parallel glass substrates covered by transparent electrodes and alignment films. Therefore, a specific molecular alignment of the liquid crystal molecules on the alignment films is achieved. Between the glass substrates, the liquid crystal molecules may continuously twist the molecular orientation along a direction of the alignment film to obtain a twist angle of 90 degree. This is the so-called twisted nematic liquid crystal. In addition, the polarizers are respectively disposed on the top and bottom surface of the liquid crystal unit.

Figure 1A:
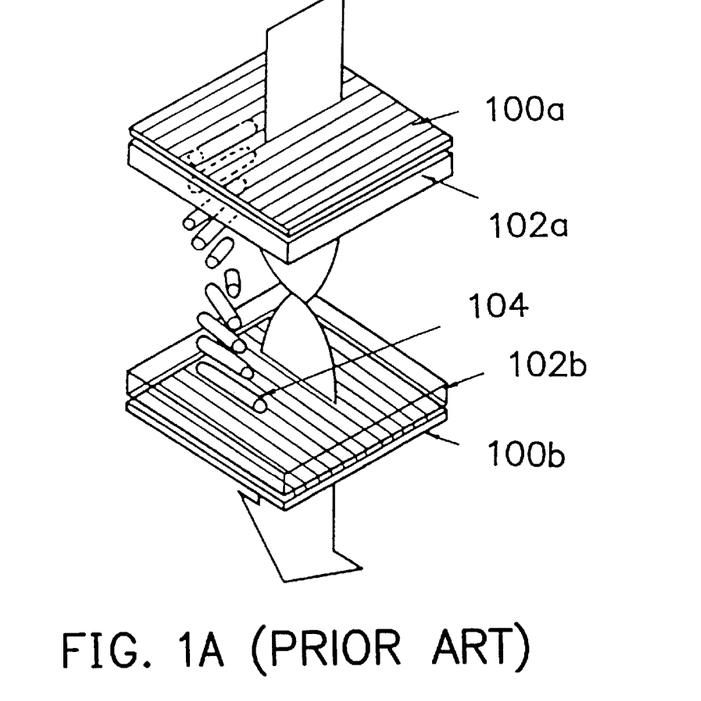
FIGS. 1A and 1B schematically show the operation of a conventional twisted nematic liquid crystal display.
Figure 1B:
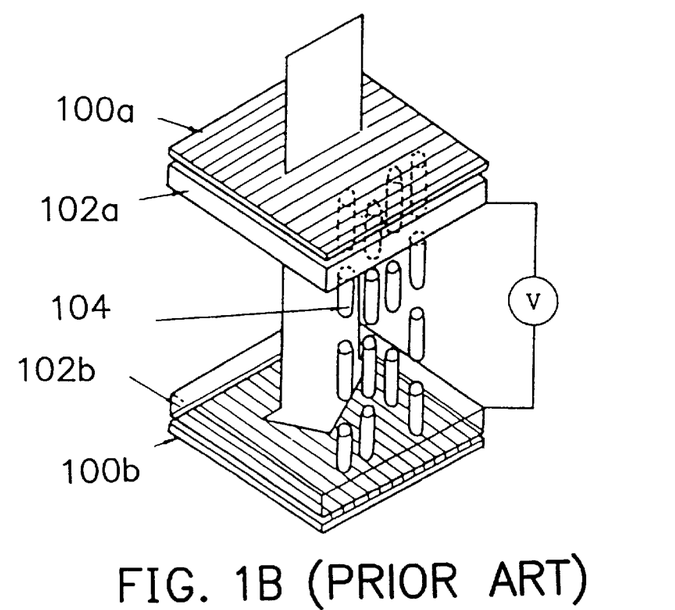

FIGS. 1A to 1B shows a schematic diagram for the operation of a convention twisted nematic liquid crystal display. In FIG. 1A, directions of the polarization for two parallel polarizers 100a and 100b are perpendicular to each other. The liquid crystal molecules 104 between a first glass substrate 102a and a second glass substrate 102b continuously twist the molecular orientation thereof according to the direction of the surface alignment films on the first and the second glass substrates 102a and 102b. Since the surface alignments on the glass substrates 102a and 102b are perpendicular to each other, an angle of the molecules between the first glass substrate 102a and the second glass substrate is 90 degree.

In FIG. 1A, the molecular alignments between the surface of the first polarizer 100a and the surface of the second glass substrate 102a are parallel, and the molecular alignments between the surface of the second polarizer 100b and the surface of the first glass substrate are 102b. Since the polarization axes of the polarizers 100a and 100b are perpendicular to each other, the twisted angle of the liquid crystal molecules is 90 degree, and the molecular alignment on each of the surface of the glass substrate is parallel to the polarization axis of the corresponding polarizer. Thus, while a light is incident onto the first polarizer 100a with a right angle, only the part of the incident light having an axis parallel to the polarization axis of the polarizer 100a can pass through to enter the liquid crystal unit. The polarization axis of the light entering the liquid crystal unit is then twisted along the orientation of the liquid crystal molecules with a right angle. This is the 90 degree optical rotation. Being twisted, the light passing through the liquid crystal molecules has a polarization axis parallel to that of the second polarizer 100b. The light can thus travel through the second polarizer 100b to display a bright image.

In FIG. 1B, by a voltage is applied on transparent electrodes on surfaces of the first and the second glass substrates 102a and 102b. The molecular alignment of the liquid crystal molecules 104 between the glass substrates 102a and 102b is changed to an arrangement parallel to the applied external electric field. Since the polarization axes of the polarizers 100a and 100b are perpendicular to each other, and the molecule alignment of the liquid crystal molecules 104 is parallel to the external electric field, the polarization axis of the incident light is parallel to that of the first polarizer without being affected by the liquid crystal molecules 104 parallel to the external electric field. After passing through the liquid crystal unit, the incident light retains a polarization axis which is parallel to the first polarizer 100a and perpendicular to the second polarizer 100b. Therefore, the light is blocked by the second polarizer 100b, and a dark image is displayed.

The twisted nematic liquid crystal display can be used as a black-and-while display by adapting the characteristic that the arrangement direction of the liquid crystal molecule is changed as an external electric field. To obtain a color display with the twisted nematic liquid crystal display, an external optical device such as a colored or multi-color external light source, a color polarizer, color filter, color reflector is used in a passive way. The additional colored or multi-color light source consumes an extra voltage load, so that the fabrication cost and the power consumption are increased. Using a color filter to achieve the color effect, a part of the light is absorbed by the color filter to reduce the light intensity. This is thus not suitable for use in the reflection type liquid crystal display equipment. Moreover, the fabrication cost is high, and the fabrication process is complex.

SUMMARY OF THE INVENTION

Accordingly, the invention provides a twisted nematic color liquid crystal display. Neither an external colored or multi-color light source not a color filter is required to achieve a multi-color or a full-color display.

In the invention, a twisted nematic liquid crystal with a small twisted angle is provided. Being assembled with polarizers and a retardation layer, a twisted nematic color liquid crystal display is formed. By adjusting optoelectronic parameters and controlling angle of optical thin film, phenomena such as dispersion, scattering, and interference, a multi-color or a fill color display is obtained. A product of refractive index anisotropy Δn and thickness d of the liquid crystal is set between about 1100 Å to 2000 Å. Adapting an active way of electrically controlled birefringence (ECB), the birefringence characteristic of the liquid crystal can be converted by altering the external electric field. The multi-color or fill color display can thus be achieved. Moreover, the application comprises reflection type, semi-penetrant type and penetrant type liquid crystal displays without the employment of external colored, multi-color light source, color filter, and other external passive optical devices.

Both the foregoing general description and the following detailed description are exemplary and explanatory only and are not restrictive of the invention, as claimed.

DESCRIPTION OF THE PREFERRED EMBODIMENTS

First Embodiment

Figure 2:
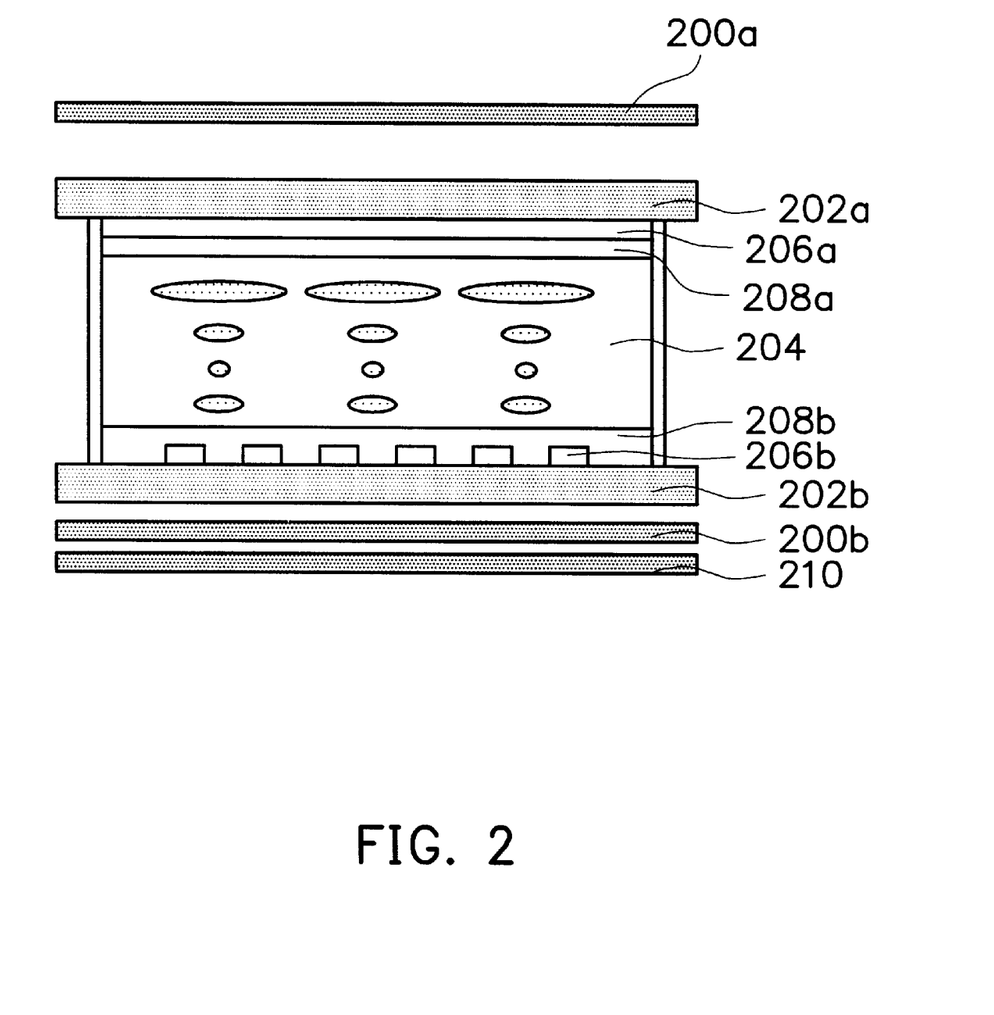
FIG. 2 is a schematic drawing of the structure of a twisted nematic color liquid crystal display according to a first embodiment of the invention.
Figure 3:
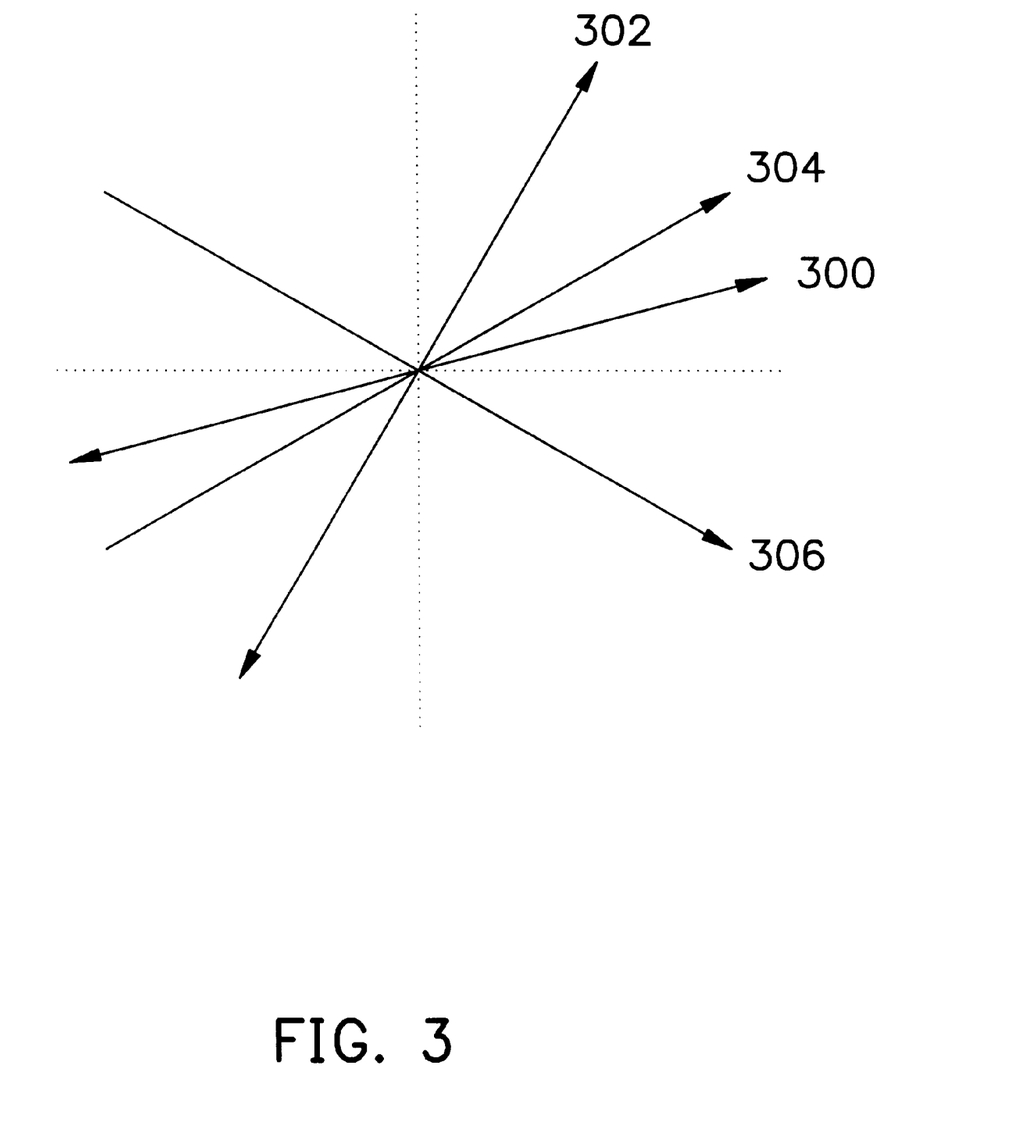
FIG. 3 shows a schematic relationship a device characteristic axis of the twisted nematic color liquid crystal display as shown in FIG. 2.

In FIG. 2, a first embodiment of a twisted nematic color liquid crystal display is shown. FIG. 3 shows a device characteristic axis of the twisted nematic liquid crystal display as shown in FIG. 2. The invention provides a twisted nemtaic liquid crystal display with birefringence controlled by electric field. In addition to a liquid crystal unit and polarizers, the twisted nematic liquid crystal display further comprises glass substrates, transparent electrodes, alignment film and nematic liquid crystal.

As shown in FIG. 2, the liquid crystal comprises two glass plates 202a and 202b, transparent electrodes 206a and 206b, alignment films 208a and 208b, and nematic liquid crystal 204. The transparent electrode 206a is formed on a first side of the glass substrate 202a. The material of the transparent electrode 206 comprises, for example, indium tin oxide, ITO). The transparent electrodes 206b, similarly, are formed on a first side of the second glass substrate 202b, wherein the first side of the first glass substrate 202a and the first side of the second glass substrate 202b faces each other and are called the inner sides thereof hereinafter. Again, the transparent electrodes 206b are made of material such as indium tin oxide. The alignment films 208a and 208b are formed on the transparent electrodes 206a and 206b, respectively. The alignment films are made of material such as polymide. Between the alignment films 208a and 208b, the nematic liquid crystal 204 is formed The alignment films 208a and 208b has been through certain alignment treatment. For example, using a piece of shag on a fast rotating roller to chafe a surface of the alignment films 208a and 208b, some micro-grooves are formed thereon to achieve the alignment. In addition, the polarizer 200a is formed on a second surface of the glass substrate 202a, that is, the outer surface of the glass substrate 202b as shown in FIG. 2. The polizer 200b is formed on a second (outer) surface of the glass substrate 202b. On the polarizer 200b, a reflection plate 210 can be further disposed to form a reflection type liquid crystal display.

However, as shown in FIG. 3B, the absorption axis of the polarizer 200a is referred as 300, while the absorption axis of the polarizer 200b is denoted as 302. The direction 304 and 306 respectively represents the molecular alignments of alignment films 208a and 208b. However, it is appreciated that the angle between the above four directions is not restricted to what is shown in the figure. The nematic liquid crystal 204 between the alignment films 208a and 208b comprises a twisted nematic liquid crystal. The angle between the molecular alignment 304 of the alignment film 208a and the molecular alignment 306 of the alignment film 208b is between about 110 degree to about 0 degree. Consequently, the twist angle of the liquid crystal molecules of the nematic liquid crystal 204 is about 70 degree to about 180 degree. Being free of an external applied voltage, a product of the refractive index anisotropy $\Delta n$ and thickness d of the nemtaic liquid crystal 204, $\Delta n \cdot d$, is set at about 1100 Å to about 2000 Å.

Figure 4:
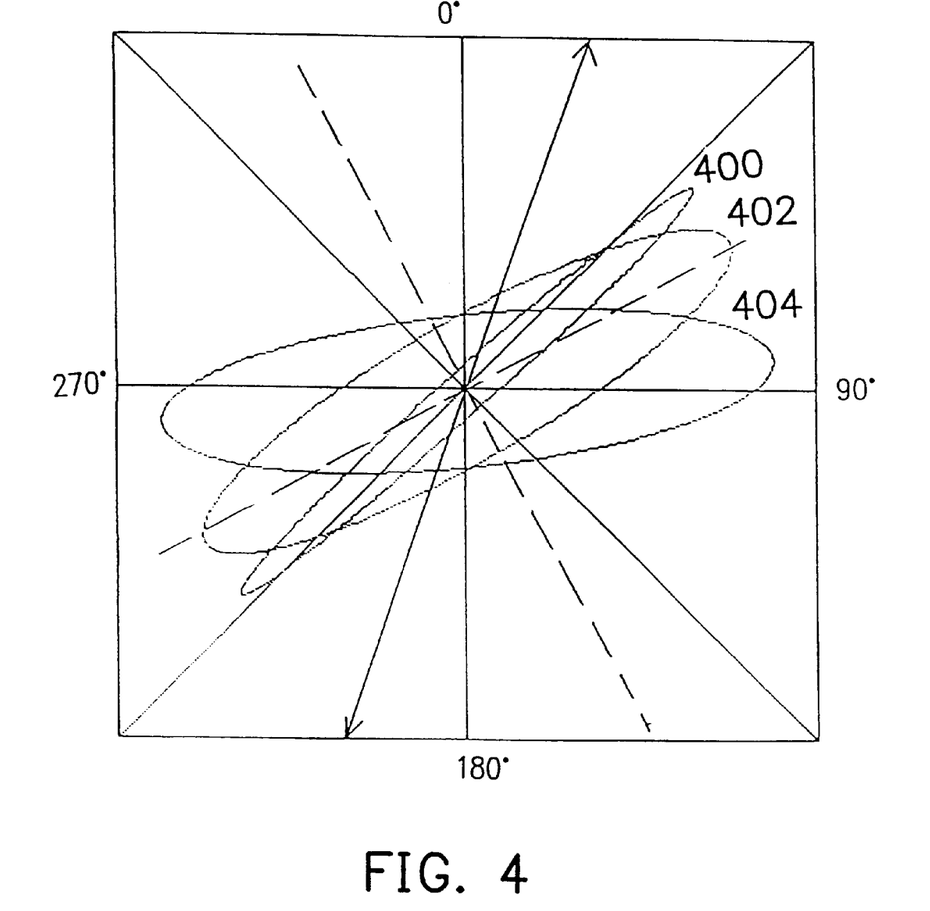
FIG. 4 shows elliptical polarization of different colored lights generated by a white light transmitting through a liquid crystal.

Liquid crystal has characteristics of birefringence and to convert the status and direction of polarization for an incident light. For example, an incident light can be converted into a linear polarized light, a circular polarized light, or an elliptical polarized light according to the optical rotatory power of the liquid crystal, followed by being reflected or transmitting though the liquid crystal. In addition, phenomena such as color dispersion, scattering and interference can be caused as specifically required. In FIG. 4, color dispersion and polarization of an incident white light passing through a liquid crystal are shown. As shown in the figure, elliptical polarized red light 400, blue light 402 and green light 404 are generated. For a white light being linear polarized by the polarizer 200b, the polarization direction is converted along a parallel direction of the liquid crystal molecules of the nematic liquid crystal 204 after entering this nematic liquid crystal 204.

While adapting an active method of electrically controlling birefringence to change the voltage applied between the transparent electrodes 206a and 206b, the molecular alignment of the liquid crystal molecules of the nematic liquid crystal 204 is altered to cause the product $\Delta n \cdot d$ (LC) to change. In addition, the polarization of the lights with different wavelengths such as red, green and blue lights are changed. Therefore, by continuously altering the applied voltage between the transparent electrodes 206a and 206b, a multi-color display can be obtained. That is, various colors can be displayed by variation of polarization status of red, green, and blue lights with different wavelengths. By changing the external voltage complied with a pixel unit comprises multiple pixels, the objective of full color display can be achieved by color addition. In addition, by simultaneously or individually adjusting the absorption directions 300 and 302 of the polarizers 200a and 200b, the background color of the liquid crystal display can be selected and changed. Moreover, with the adjustment of the product of the refractive index and the thickness Δn·d, plus other optical parameters such as the absorption direction 300 and 302, the objectives of a multi-color or fill color display can be achieved.

Second Embodiment

Figure 5:
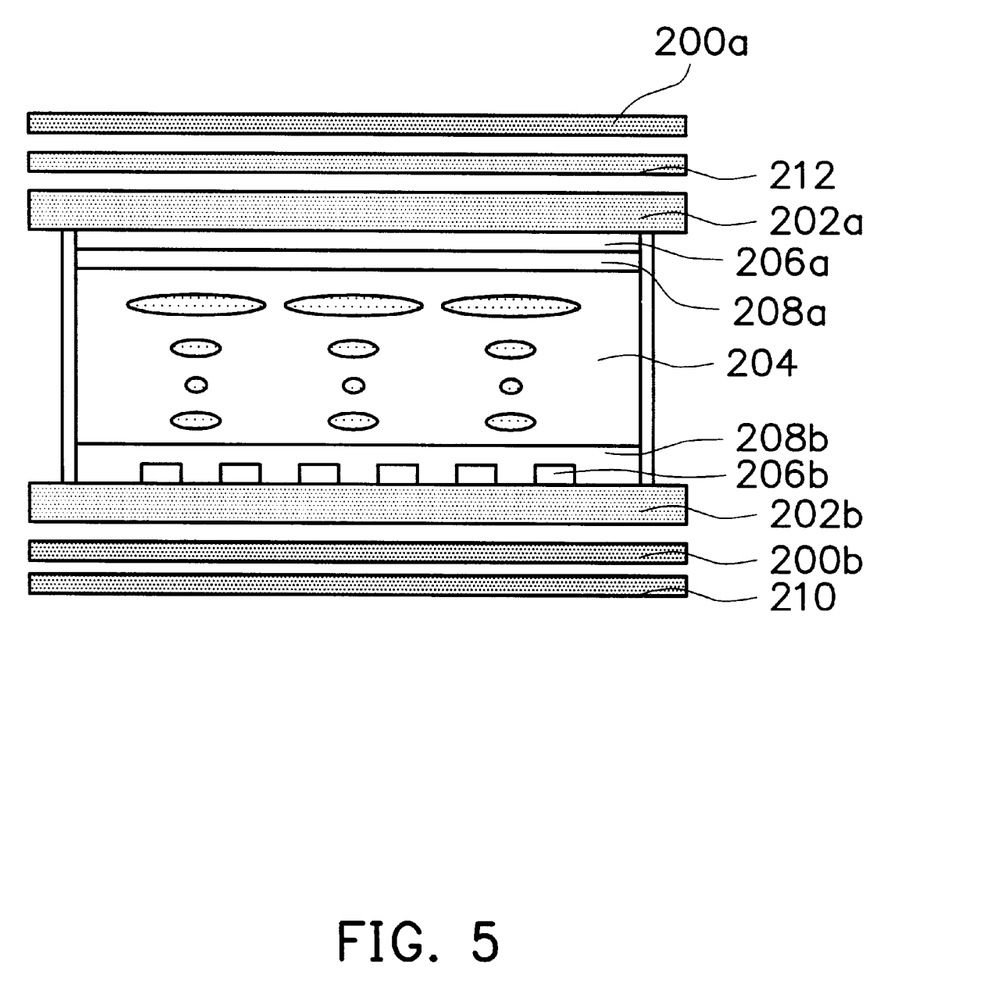
FIG. 5 is a schematic drawing of the structure of a twisted nematic color liquid crystal display according to a second embodiment of the invention.
Figure 6:
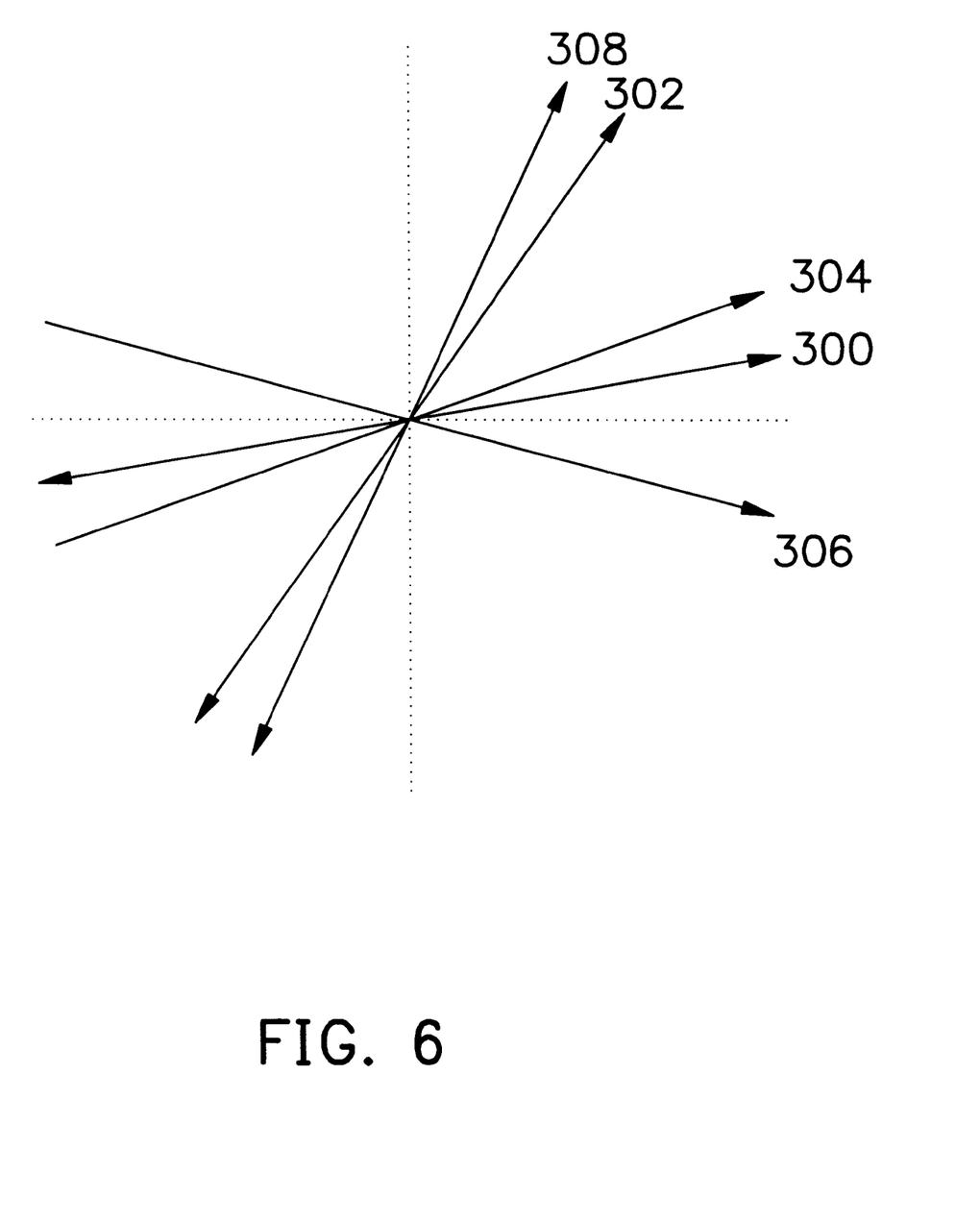
FIG. 6 shows a schematic relationship a device characteristic axis of the twisted nematic color liquid crystal display as shown in FIG. 5.

In FIG. 5, a second embodiment of a twisted nematic color liquid crystal display is shown. FIG. 6 shows a device characteristic axis of the twisted nematic liquid crystal display as shown in FIG. 5. The invention provides a twisted nemtaic liquid crystal display with birefringence controlled by electric field. The members which the twisted nematic liquid crystal display comprises are similar to those of the twisted nematic liquid crystal display as described in the first embodiment. In addition to a liquid crystal unit and polarizers, the twisted nematic liquid crystal display further comprises a retardation layer.

As shown in FIG. 5, the structure of the liquid crystal unit is similar to that of the liquid crystal unit in the first embodiment. Transparent electrodes 206a and 206b are formed on inner surfaces of the glass substrate 202a and 202b, respectively. The transparent electrodes 206a and 206b are made of, for example, indium tin oxide. Alignment films 208a and 208b made of, for example, polymide, are formed on the electrodes 206a and 206b, and a nematic liquid crystal 204 is formed between the alignment films 208a and 208b.

A retardation layer 212 is formed over the outer surface of the glass substrate 202a with a polarizer 200a formed in between, while a polarizer 200b is formed on the outer surface of the glass substart 200b. Optionally, a reflection plate 210 can be formed on the polarizer 200b.

In addition to the absorption directions 300, 302 of the polarizers 200a, 200b, and molecular alignments 304, 306 of the alignment films 208a, 208b as shown in FIG. 3, FIG. 6 further shows a direction of a slow axis 308 of the retardation layer 212. It is appreciated that angles between these five characteristic directions are not restricted by the relationship as shown in FIG. 6. Again, similar to the first embodiment, the angle between the molecular alignments 304, 306 of the alignment films 208a and 208b is ranged from about 110 degree to about 0 degree. Thereby, a twist angle of liquid crystal molecules of the nematic liquid crystal 204 is resulted in a range between about 70 degree to about 180 degree. Under the circumstance of free of an external applied voltage, the product Δn·d of the nematic liquid crystal 204 is set of a certain value between about 1100 Å to about 2000 Å. The retardation function of the retardation layer 212 enables a variation in display spectrum of the liquid crystal display. By adjusting product Δn·d of the retardation layer 212 (PH) can thus achieve the objective of displaying different colors. Preferably, the product Δn·d of the retardation layer 212 is set at about 1100 Å to about 2500 Å.

The operation mode of this liquid crystal display is similar to that of the liquid crystal display in the first embodiment. The active method of electrically controlled birefringence is applied. By changing the applied voltage between the transparent electrodes 206a and 206b, plus the variation of the product Δn·d (LC), alteration in polarization of the light in different colors with different wavelength is caused. Therefore, by continuously altering the applied voltage between the transparent electrodes 206a and 206b, various colors can be displayed by variation of polarization status of red, green, and blue lights with different wavelengths. In addition, by simultaneously or individually adjusting the absorption directions 300 and 302 of the polarizers 200a and 200b, the background color of the liquid crystal display can be selected and changed. Moreover, by the adjustment of the products of the refractive index and the thickness Δn·d of both the nematic liquid crystal 204 and the retardation layer 212, plus other optical parameters such as the absorption direction 300 and 302, the objectives of a multi-color or full color display can be achieved.

In the prior technique, an external passive device such as a colored, multi-color or a color filter is used to perform a color display. The electrically controlled birefringence can only be effectively applied to those super twisted nematic (STN) liquid crystals with a larger twist angle (240 degree) to achieve a color display. In the invention, the electrically controlled birefringence can be effectively applied to twisted nematic liquid crystal displays with a twist angle as low as the range of 70 to 180 degree. Consequently, the invention us an active method of electrically controlling birefringence to obtain a multi-color or a full color display without the application of any external color or multi-color light source.

The invention can be applied for various kinds of displays. By properly adjusting optical parameters such as polarization direction of the polarizers, Δn·d (LC) and Δn·d (PH), displays for different purpose of use can be fabricated. The displays comprises, for example, a positive liquid crystal display which can displays a white or light color background suitable for use of mobile text and graphic displays. Or a negative liquid crystal display shows a black or dark background suitable for use in penetrant type or projection type liquid crystal displays.

Adjusting the above parameters may also achieve an objective to ameliorate the monochromatic effect of the conventional liquid crystal display into a multi-color or full color display. In addition, the background can be selected as required, for example, a white, red, black, green, and blue background can be displayed.

Figure 7:
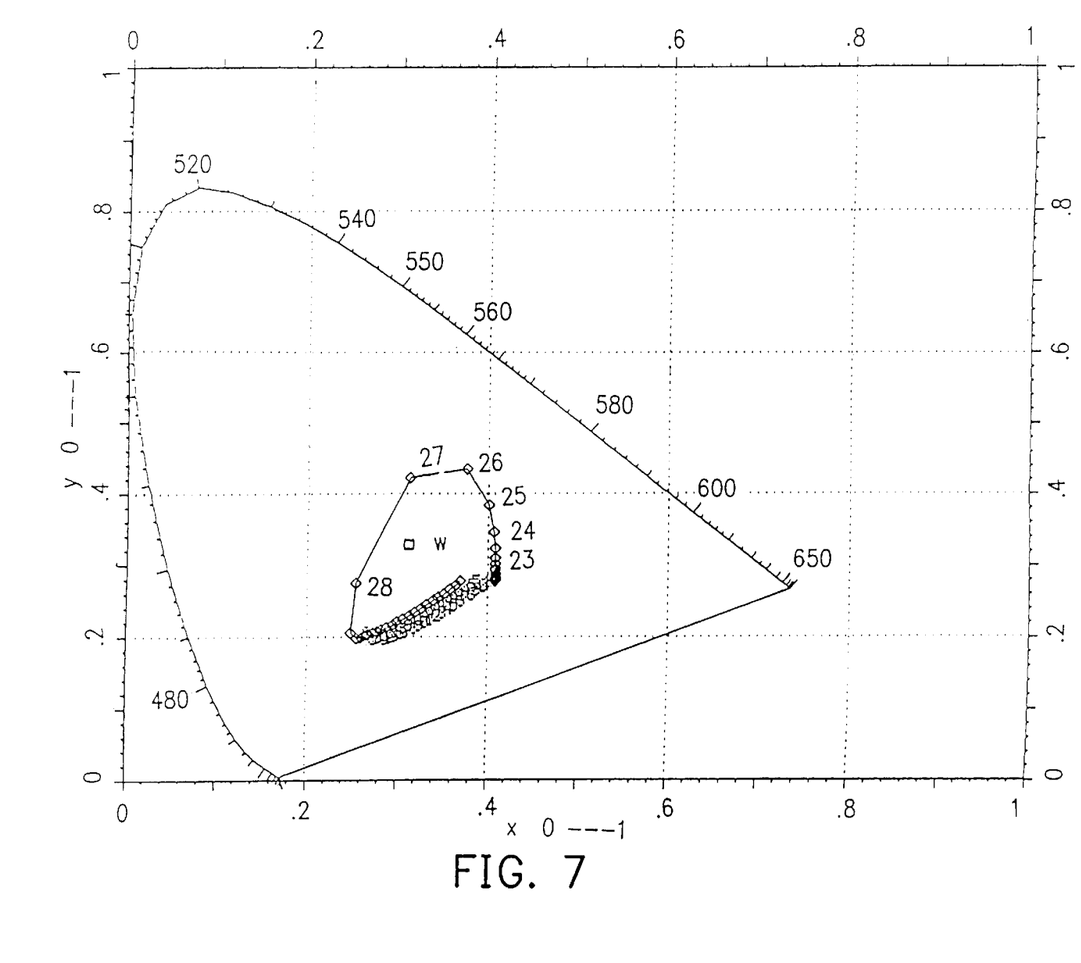
FIG. 7 shows a hue variation diagram in a chromaticness coordinate corresponding to the variation of an electric field while the twisted nematic color liquid crystal display shows a pink colored background.
Figure 8:
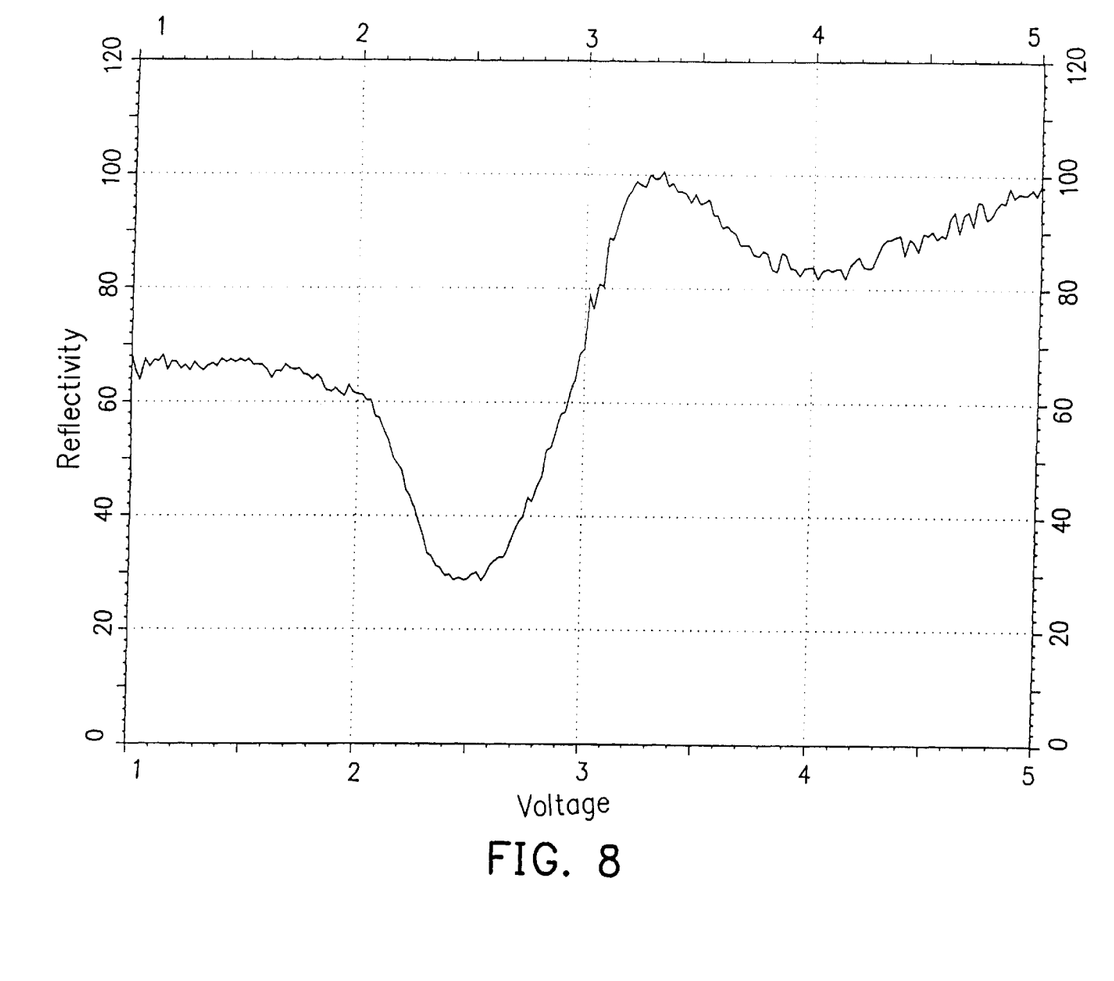
FIG. 8 shows a curvature reflecting a relationship between the refractive index and the voltage while the twisted nematic color liquid crystal display shows a red colored background.
Figure 9:
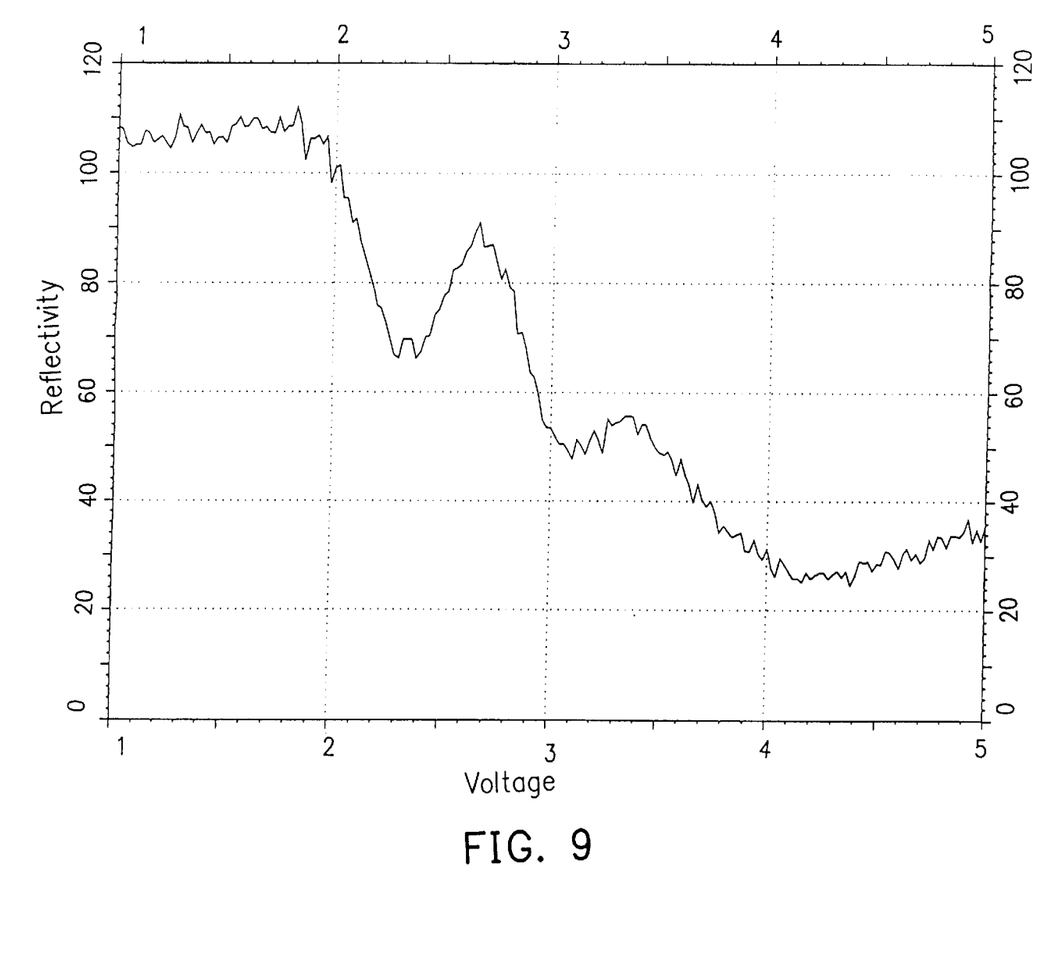
FIG. 9 shows a curvature reflecting a relationship between the refractive index and the voltage while the twisted nematic color liquid crystal display shows a green colored background.
Figure 10:
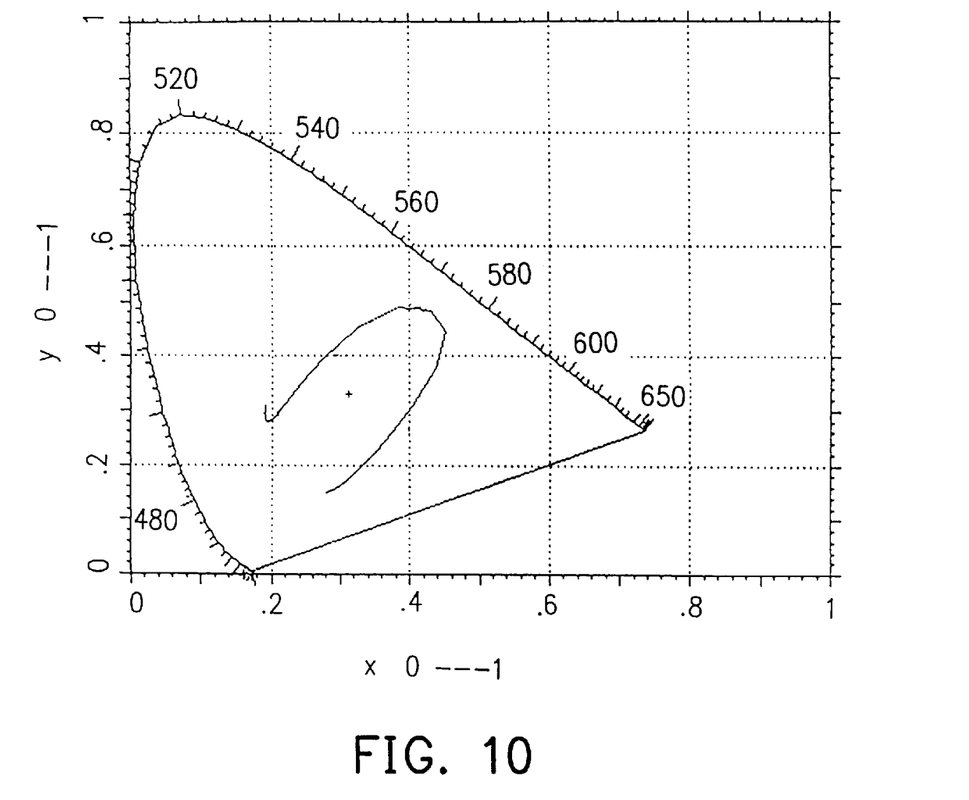
FIG. 10 shows a hue variation diagram in a chromaticness coordinate corresponding to the variation of an electric field while the twisted nematic color liquid crystal display shows a black background.

FIG. 7 shows a hue variation in a chromaticness coordinate corresponding to the variation of an electric field while the twisted nematic color liquid crystal display shows a pink colored background. FIGS. 8 and 9 show a curvature reflecting a relationship between the refractive index and the voltage while the twisted nematic color liquid crystal display shows a red and green colored background, respectively. FIG. 10 shows a diagram of a hue variation in a chromaticness coordinate corresponding to the variation of an electric field while the twisted nematic color liquid crystal display comprising a retardation layer shows a black background. The twisted nematic liquid crystal display provided in the invention can show various background color as required without the application of an external electric field. In addition, different methods for driving the liquid crystal display can be used, for example, using an active driving technique of thin film transistor (TFT) or multiplexing driving technique to perform a color display.

The addition of the retardation in the twisted nematic liquid crystal display changes the display spectrum thereof and the relationship between the transmittance for different color lights and the external applied voltage. Furthermore, it can also demonstrate characteristics of changing color and different background color. Without the retardation, the fabrication process is simple with a reduced cost, and the brightness or chroma of image can be enhanced. Each pixel in the twisted nematic liquid crystal display can display a multi-color image. Using color addition, variation of colors can be increased to display a full color multi-level spectrum. Moreover, the response time of the twisted nematic liquid crystal display is typically larger than 300 msec, for example, as fast as 900 msec. In the invention, the response time of the twisted nematic liquid crystal time has been reduced to about 100 msec to about 300 msec.

In the above embodiments, only by using the color dispersion through the liquid crystal, a color display is obtained without the application of any external device such as a color filter or a color back light. Using a conventional multiplexing driving technique, a multi-color or full color display can be obtained with a low fabrication cost. Alternatively, a thin film transistor can also be used to drive the color display. Since the external device is not required, the complexity of fabrication process is resolve, while the yield thereof is improved. Current, the portable display is restricted to black and white reflection type liquid crystal display. The passive type color liquid crystal display can not be properly used outdoors due to a large power consumption. However, by applying this invention, the fabrication process is similar to that of the typical nematic liquid crystal display without additional material and fabrication cost, the twisted nematic color display provided by this invention can be used as an outdoor display. The product is thus very competitive in market.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A twisted nematic color liquid crystal display, comprising:
   a first glass substrate;
   a second glass substrate, disposed parallel to the first glass substrate; and
   a nematic liquid crystal, between the first and the second glass substrates, wherein nematic liquid crystal has a twist angle of about 70 degree to about 180 degree and a product of refractive index anisotropy and a thickness ranged from about 1100 Å to about 2000 Å.

2. The twisted nematic color liquid crystal display according to claim 1, comprising further:
   a first transparent electrode, disposed between the first glass substrate and the nematic liquid crystal; and
   the second transparent electrode, disposed between the second glass substrate and the nematic liquid crystal display.

3. The twisted nematic color liquid crystal display according to claim 2, comprising further:
   a first alignment film, disposed between the first electrode and the nematic liquid crystal display; and
   a second alignment film, disposed between the second electrode and the nematic liquid crystal display.

4. The twisted nematic color liquid crystal display according to claim 1, comprising further:
   a first polarizer, positioned over a second surface of the first glass substrate opposite to a first surface thereof having the nematic liquid crystal thereon; and
   a second polarizer, positioned over a second surface of the glass substrate opposite to a first surface thereof having the nematic liquid crystal thereon.

5. The twisted nematic color liquid crystal display according to claim 4, comprising further a reflection plate, wherein the second polarizer is between the reflection plate and the second glass substrate.

6. The twisted nematic color liquid crystal display according to claim 1, comprising further a retardation layer between the first glass substrate and the nematic liquid crystal.

7. The twisted nematic color liquid crystal display according to claim 6, wherein the retardation layer has a product of refractive index anisotropy and thickness ranged from about 1100 Å to about 2500 Å.

8. The twisted nematic color liquid crystal display according to claim 6, comprising further:
   a first polarizer, between the retardation layer and the nematic liquid crystal; and
   a second polarizer, between the glass substrate and the nematic liquid crystal.

9. The twisted nematic color liquid crystal display according to claim 8, comprising further a reflection plate, disposed on a side of the second polarizer opposite to the other side of the second polarizer facing the nematic liquid crystal.

10. A twisted nematic color liquid crystal display, comprising:
    a first and a second polarizers;
    a nematic liquid crystal, between the first and the polarizers;
    a first glass substrate, between the first polarizer and the nematic liquid crystal;
    a second glass substrate, between the second polarizer and the nematic liquid crystal;
    a first alignment film, between the first glass substrate and the nematic liquid crystal; and
    a second alignment film, between the second glass substrate and the nematic liquid; wherein
    the nematic liquid crystal has a twist angle of about 70 degree to about 180 degree and a product of refractive index anisotropic and thickness of about 1100 Å to about 2000 Å.

11. The twist nematic color liquid crystal display according to claim 10, comprising further:
    a first transparent electrode, between the first glass substrate and the first alignment film; and
    a second transparent electrode, between the second glass substrate and the second alignment film.

12. The twist nematic color liquid crystal display according to claim 10, comprising further a retardation over the first polarization layer.

13. The twist nematic color liquid crystal display according to claim 12, wherein the retardation layer has a product refractive index anisotropy and thickness of about 1100 Å to about 2500 Å.

14. The twist nematic color liquid crystal display according to claim 10, comprising further a reflection plate over the second polarizer.

* * * * *